United States Patent [19]

Risgin et al.

[11] 3,808,436

[45] Apr. 30, 1974

[54] APPARATUS FOR GAS ANALYSES

[75] Inventors: Ojars Risgin, Grass Lake; Charles B. Arnold, Saline; Peter A. Hubbard, Ann Arbor; Edward D. Scarborough, Inkster, all of Mich.

[73] Assignee: Sensors, Inc., Ann Arbor, Mich.

[22] Filed: June 28, 1973

[21] Appl. No.: 374,554

[52] U.S. Cl. .................. 250/344, 250/343, 250/350
[51] Int. Cl. .......................................... G01n 21/26
[58] Field of Search ........... 250/344, 343, 349, 350; 356/51

[56] References Cited
UNITED STATES PATENTS

| | | | |
|---|---|---|---|
| 3,162,761 | 12/1964 | Luft | 250/344 |
| 3,700,891 | 10/1972 | Luft | 250/343 |
| 3,588,496 | 6/1971 | Snowman | 250/43.5 |

*Primary Examiner*—Archie R. Borchelt
*Assistant Examiner*—B. C. Anderson
*Attorney, Agent, or Firm*—Shanley and O'Neil

[57] ABSTRACT

Apparatus for performing multiple gas analyses simultaneously in which a plurality of optical gas analysis assemblies are mounted in a frame housing in a manner to be operative with a single chopper disc. Each optical gas analysis assembly includes a support plate means supporting a single source of radiant energy and a single detector of such radiant energy, structure defining a sample gas chamber and a reference gas chamber between the source and detector, optical means for directing radiant energy from the source through the gas chambers to the detector, and ports for entry and exit of test gas. Calibration means and circuit housing means can be mounted on each optical assembly. Phase reference generating means mounted within the frame housing coact with the single chopper disc and provide for selecting the synchronous relationship between the phase reference generating means and passage of radiant energy through the gas chambers of each optical assembly. Circuit connector means connect the output of each radiant energy detector to its respective signal separation circuitry.

19 Claims, 7 Drawing Figures

PATENTED APR 30 1974 3,808,436

APPARATUS FOR GAS ANALYSES

This invention relates to a multiple unit gas analyzer apparatus. In the specific embodiment of the invention an optical gas analysis assembly includes a support plate for a single source of radiant energy, a single detector for such radiant energy, cell structure defining sample and reference gas chambers in aligned contiguous relationship, optic means for directing the radiant energy from the source through the gas chambers to the detector, and cover means for such supported structures. A single chopper disc coacts with a plurality of such optical gas analysis assemblies. The basic multiple gas analyses concept and specific aspects of signal separation circuitry are described and claimed in a co-pending application, entitled "Gas Analyzing" Ser. No. 374,553 filed by Ojars Risgin and Charles B. Arnold concurrently with the present application and assigned to a common assignee.

Many prior art commercial gas analyzers employ Luft cells in which the capacitance of the Luft cell is changed by infrared induced pressure changes. The reliability of such devices is jeopardized by vibration. The present structure eliminates or minimizes the effect of vibration making it suitable for rugged-use applications e.g., inspection station testing of internal combustion engine emissions.

Prior art dual-beam instruments commonly use dual detectors which inherently present problems of matching and thermal balancing. Such problems are eliminated by the single-source and single-detector arrangement of the present invention. Also complicated optical systems of the prior art are prone to damage and are not as suitable for the rough-handling field use made practicable by the mechanical and electronic features of the present invention.

Distinguishing contributions of the present invention over the prior art stem from provision of a rugged analyzing apparatus which makes analyzing of small quantities of gases with a high degree of accuracy possible. The novel apparatus is relatively inexpensive so it can be placed in general use and can be used for field testing of one or more gases simultaneously. Structural features of the invention include multi-unit support structure which permit analysis of a plurality of gases or analysis of a plurality of gas constituents simultaneously while using a single chopper structure. Another unique feature provides a unitary cell structure including a curvilinear dividing wall forming sample gas and reference gas chambers in side-by-side relationship extending longitudinally between the single source and detector for the radiant energy used for analysis. The curvilinear dividing wall coacts with the circumferential path of the chopper windows which permit passage of radiant energy through each gas path.

Other features and advantages of the invention will be considered during the detailed description of the invention. The accompanying drawings, briefly identified below, form part of such detailed description.

Figures 1, 3, 4:
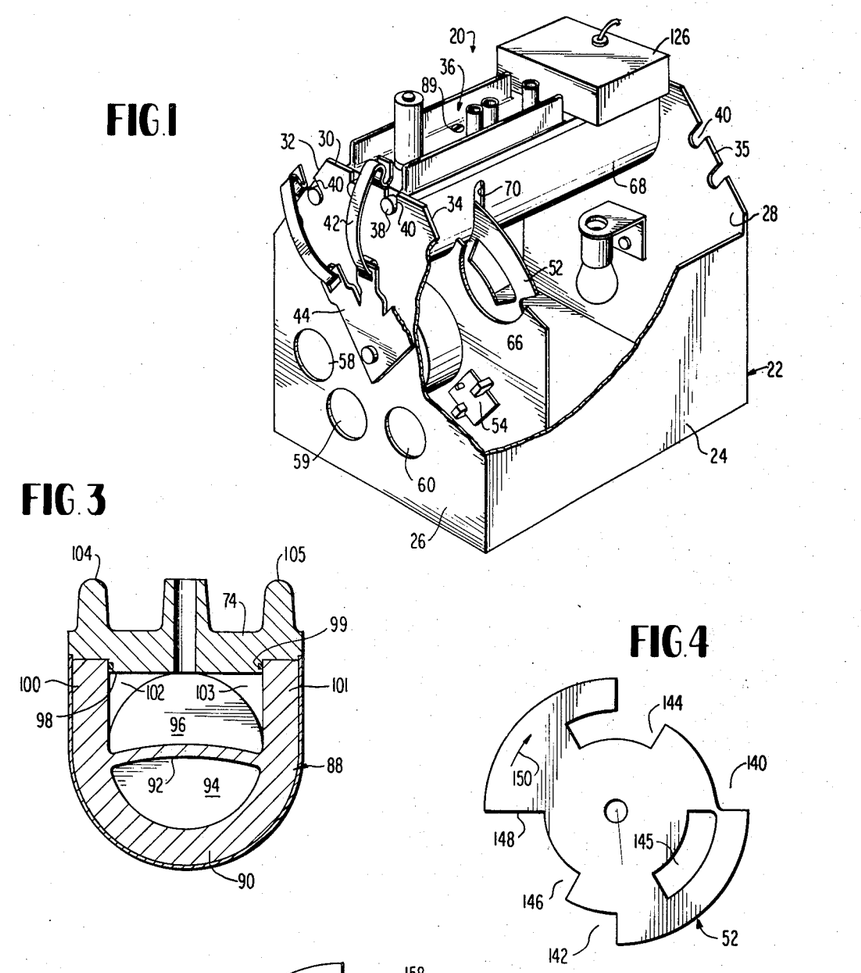
FIG. 1 is a perspective view, with portions cut away, of a multi-unit gas analyzer device embodying the invention.
FIG. 3 is a cross-sectional view of novel cell structure taken along the lines 3—3 of a portion of FIG. 2.
FIG. 4 is a plan view of a representative chopper disc for generating dual frequency electrical output.
Figure 2:
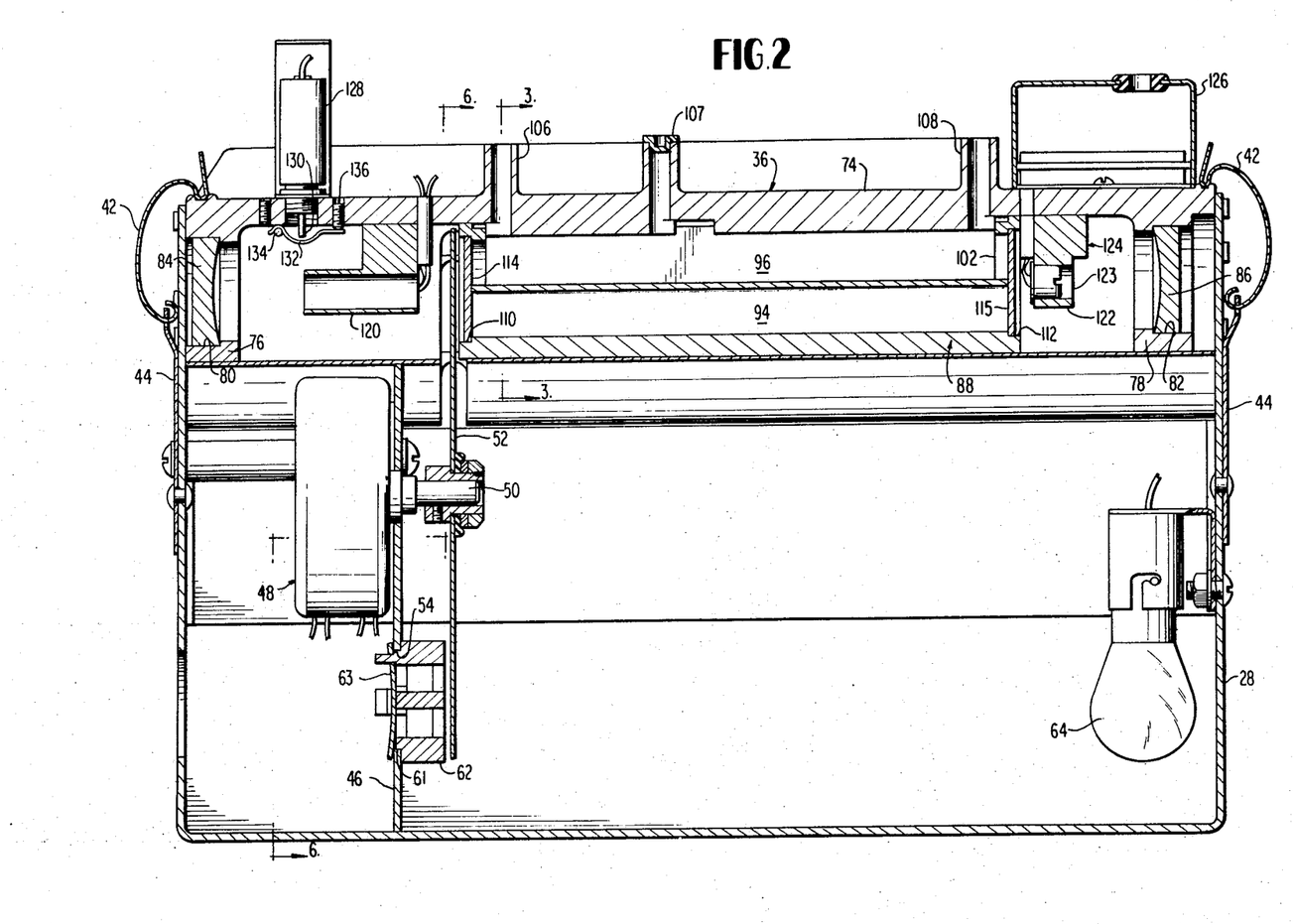
FIG. 2 is a detailed cross-sectional view along the mid-section of the embodiment of FIG. 1.

Referring to FIGS. 1 and 2, gas analyzer device 20 has a frame-like housing 22 with side walls 24, a front wall 26, and a rear wall 28. The upper portion of front wall 26 presents a centrally-located horizontal edge 30. Sloping edges 32 and 34 depend downwardly and outwardly in angled relation to horizontal edge 30. The upper portion of rear wall 28 is similarly formed.

An optical gas analysis assembly 36 is supported by front and rear walls 26 and 28. Support pins 38 extending from such gas analyzer unit 36 seat in upwardly opening slots 40 formed in top edge 30 of front wall 26. Similar pins (not shown) cooperate with like slots at the top edge of rear wall 28. Spring clips connected to a mounting plate 44 on the respective front and rear walls 26 and 28 provide for releasably securing analyzer units, such as 36, to housing 22.

Within frame means 22, in spaced relation from front wall 26, is a motor support partition 46 which is secured between side walls 24. Mounted on partition 46 is a chopper disc drive motor 48 having a shaft 50 which extends through the partition. Circular chopper disc 52 is secured to shaft 50.

An arcuate slot 54 lying along a substantially circumferential path about the axis of rotation of chopper disc 52 is formed in partition 46. Slot 54 which supports phase reference signal generating elements extends a substantial distance across the partition in general alignment with access openings 58–60 in front wall 26. Slot 56 provides for adjustably mounting one or more photodetector support blocks 62 in a predetermined circumferential position relative to chopper disc 52. Support blocks 62 are secured to the partition with retaining clips 63. Light source 64 is mounted on rear wall 28 and provides a common source of radiant energy for the photodetector.

Considering accommodation of a plurality of units, note in FIG. 1 that sloping edge 35 of rear wall 28 has upwardly opening positioning slots 40 as described earlier and, that sloping edge 32 of front wall 26 has similar slots 40. It will be understood that the sloping edge parallel with front edge 32 (not shown in FIG. 1) and the sloping front edge 34 also have positioning slots 40. This arrangement enables placing two additional gas analyzer units, similar to analyzer unit 36, on housing means 22 along the arcuate path in substantially circumferential relationship to the axis of rotation of chopper disc 52 so the multiple unit analyzer device 20 can be used to simultaneously analyze several different gases, or determine several different constituents of the same gas. To accommodate several analyzer units partition 46 has its top edge scalloped as at 66 at several locations to receive the U-shaped cover 68 of each analyzer unit. Cover 68 has a transverse slot 70 formed to accommodate passage of chopper disc 52. Other units placed on the device have similar transverse slots and are operative and coact with the same single chopper disc 52.

Structural features of an optical gas analysis assembly are shown in FIG. 2. Analyzer unit 36 includes a rigid elongated support plate 74 with various unitary components and integral gas cell structure. At each end of support plate 74 are optical structure support brackets 76 and 78, which can be unitary with the support plate, each having a generally U-shaped periphery and counterbored openings 80 and 82, respectively. The openings 80 and 82 have their axes precisely aligned so the axes of concave mirrors 84 and 86 mounted in the respective bores have their focal axes coincident.

Gas cell structure 88 is secured, e.g., by bolt means such as bolt 89 in FIG. 1, to support plate 74 at a location spaced from ends 76 and 78. Cell structure 88 comprises a unitary body member which, as shown in FIG. 3, is generally U-shaped with a rounded bottom 90. Part of the unique structure is an arcuately curvilinear divider 92 which divides the cell assembly into a lower gas chamber 94 and an upper gas chamber 96. Coaction of curvilinear partition 92, which lies along a circumferential path about the chopper disc axis of rotation, and the chopper disc windows are considered later. Upper chamber 96 can have an open top which is closed by support plate 74. As shown this closure means comprises a generally rectangular projecting block portion 98 of dimensioned to provide a close fit, with gasket means 99, between the upper side walls 100 and 101.

As shown in FIG. 3, transverse wall portions 102 and 103, extending in a transverse direction partially cover the cross-sectional area between the sidewalls to provide a generally half-moon configuration in cross section for chamber 96. The latter is similar to but slightly larger than chamber 94. These partitions 102, 103 are located at the longitudinal ends of chamber 96.

Support plate 74 has upwardly extending strengthening ribs 104, 105 at each longitudinal side which add beam strength to the plate which serves as the "backbone" for the assembly. As seen in FIGS. 2 and 3, gas supply ports 106–108 are formed in support plate 74 and open into upper chamber 96 of cell structure 88. These provide for introduction or flow of a sample gas to be tested, for example, through port 106 into chamber 96 and out of port 108 during operation of the apparatus. Providing a plurality of these ports, in excess of two, distributed longitudinally, permits the same support structure to be used with cells of differing lengths. A larger cell provides greater sensitivity to small gas concentrations. For example, carbon monoxide measured in the range of 0 to 10 percent would use a cell length of 2 inches while hydrocarbons measured in the range of 0 to 2,000 ppm (9 to 0.2 percent) would use a cell length of 5 inches.

Counterbored openings 110 and 112 at the ends of cell structure 88 provide seats for gas chamber windows 114, 115 which close the respective ends of both lower chamber 94 and upper chamber 96. Lower chamber 94 can be filled with a reference gas of known composition and this gas is sealed in the lower or reference gas chamber 94 by windows 114, 115. The sample gas to be analyzed flows through upper or sample gas chamber 96 through respective ports 106 to 108. Windows 114 and 115 are generally circular in configuration, are made of sapphire, quartz, or other insoluble window material, and are cemented to the longitudinal ends of the unitary body member including the divider means 92 to provide gas-tight seals.

The forward end of cell structure 88 is closely adjacent chopper disc 52. A single source of infrared radiation 120 is secured to support plate 74 between chopper disc 52 and mirror 84. The source of infrared radiation 120 can be of the black-body, resistance wire heated type. Infrared source 120 is mounted with its axis coincident with the axes of mirrors 84 and 86.

Infrared detector 122 is located between mirror 86 and the rearward end of cell structure 88. Infrared detector 122, with infrared filter 123, is secured to the underside of support plate 74 by a mounting block 124. The mounting blocks for the infrared source 120 and infrared detector 122 are each relatively narrow as viewed axially to avoid significant blocking of infrared rays from source 120 which are reflected by mirror 84 to mirror 86 and then onto detector 122. Advantageously, the heat source of infrared source 120 is mounted at the focal point of concave mirror 84 and the detector element of detector 122 which is similarly mounted at the focal point of concave mirror 86.

Support plate 74 also supports a circuit housing 126 (upper right in FIG. 2) for the electronic amplifier for gas analyzer unit 36. By mounting this circuitry closely adjacent the detector, lead length losses are avoided and amplification of the signals from detector 122 is accomplished without the likelihood of external interference.

Calibration means including solenoid 128 is mounted at the opposite end of the support plate 74 above infrared source 120. Solenoid 128 includes a plunger 130 which is located adjacent to a combination calibration and test tab 132. Tab 132 is spring urged to its retracted position shown in FIG. 2 by a suitable spring located at hinge pin 134. This normally maintains the tab in engagement with adjustment screw 136, accessible through plate 174, which permits varying the position of the tab in the path of travel of infrared radiation from mirror 84 for balancing. In addition, when solenoid 128 is energized, plunger 130 moves tab 132 downwardly into the path of travel of infrared radiation from mirror 84. Only the radiation passing through sample cell 96 is affected by the position of tab 132. To balance the instrument initially, screw 136 is adjusted. To assure that the system is operating properly, solenoid 128 can be selectively actuated to block a portion of the sample path radiation to attenuate radiation equivalent to a known percentage of gas.

As shown in FIG. 4, chopper disc 52 includes two outer windows 140 and 142, each extending 90° circumferentially and located 180° out of phase with respect to each other. There are also three windows 144–146 each extending 60° circumferentially and located 120° out of phase with respect to each other. The configuration of the inner windows and outer windows is such that edge 148 is common to both outer slot 142 and inner slot 146. When viewed from the front as in FIG. 4, disc 52 is rotated clockwise in the direction of arrow 150. By virtue of the two outer windows 140 and 142 and the three inner windows 144–146, chopper blade 52 provides dual frequency exposure when rotated in the sample and reference paths, i.e., interrupting the infrared radiation passing through the reference chamber 94 and sample chamber 96 of FIG. 2 at separate frequencies determined by the rpm of chopper disc 52.

Figure 5:
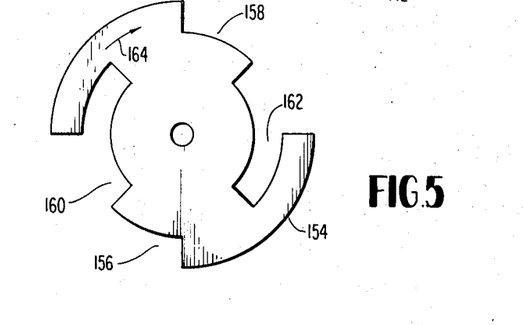
FIG. 5 is a plan view of a representative chopper disc for single frequency dual phase operation.

FIG. 5 shows a chopper disc 154 with the same number of outer and inner windows. These are two outer windows 156 and 158 each extending 90° circumferentially and located 180° out of phase with respect to each other and, two inner windows 160 and 162 each extending 90° circumferentially and located 180° out of phase with respect to each other. Inner windows 160 and 162 are out of phase with respect to outer windows 156 and 158 so the inner windows lead the outer windows by 45° when disc 154 is rotated clockwise in the direction of arrow 164. Selection of the chopper disc 52 of FIG. 4 or the chopper disc 154 of FIG. 5 is primarily related to the type of detector utilized. Both chopper discs provide for phase sensitive separation of the detector signals resulting from chopping the infrared radiation in the sample and reference paths of each assembly.

Figure 6:
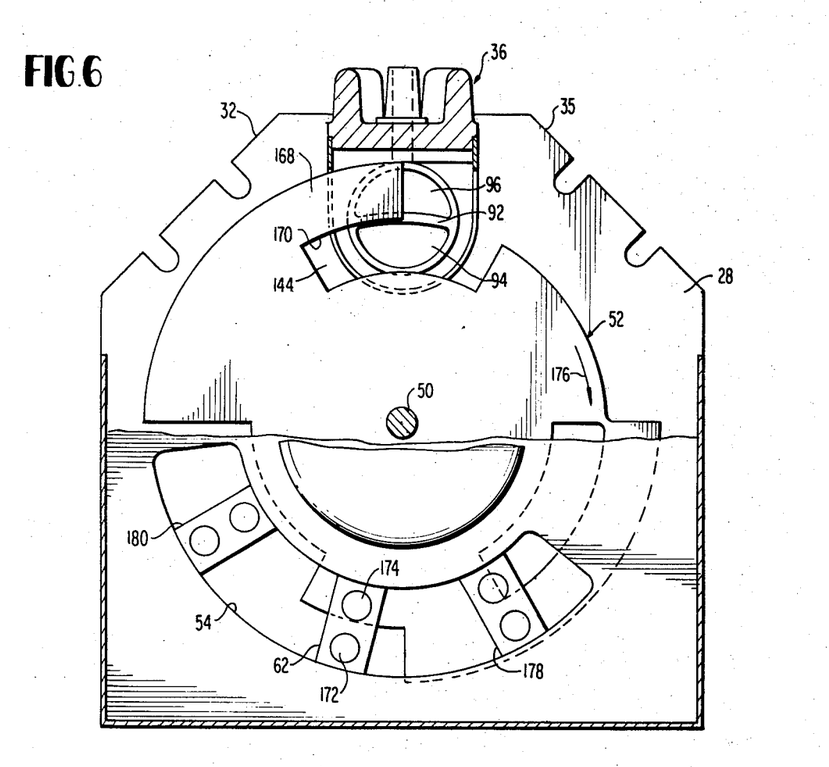
FIG. 6 is a sectional view in elevation, with portions cut away for clarity, taken along the lines 6—6 of FIG. 2, and FIG. 7 includes a schematic diagram of a representative circuit for providing phase sensitive separation of sample and reference path signals.

FIG. 6 shows the relationship between chopper disc 52, analyzer unit 36, and photodetector mounting block 62. It will be seen from FIG. 6 that the height of reference gas chamber 94 as measured along a radius of disc 52 is approximately equal to the radial dimension of window 144 of the disc. Edge 170 of disc blade portion 168 is located at the center line of divider partition 92 which divides the cell structure into reference and sample chambers. The divider partition curves circumferentially about the fixed center axis of rotation of disc 52, i.e., motor shaft 50. The various inner and outer windows have their inner and outer edges curving circumferentially with respect to the axis of shaft 50. This arrangement coupled with the curvature of divider partition 52 provides for free travel of radiation along either path when uncovered by a window of the disc and complete blocking of radiation along a path when covered by a solid portion of the chopper disc.

Considering the phase reference generating means, photo-sensitive devices such as phototransistors 172 and 174 are mounted in each photodetector block 62. Slot 54 of partition 46 is so formed, relative to mounting block 62, that phototransistor 172 is mounted along the travel path of the inner windows 144–146 of disc 52 and transistor 174 is mounted along the travel path of outer windows 140 and 142 of the disc. When disc 52 rotates, the disc chops the infrared radiation from the infrared source as well as the light eminating from bulb 64 which is on the opposite side of disc 52 from phototransistors 172 and 174. In the embodiment of FIG. 6 transistor block 62 is not symmetrically opposite the location of the sample and reference gas paths but is circumferentially spaced a distance greater than 180° in the direction of rotation of disc 52. Each phototransistor block has flat support shoulders 61 permitting force fit in slot 54 of partition 46. Each block is made of electrical insulating resilient material. This enables shifting the blocks as required to obtain the desired synchronous signal generation.

Additional optical gas analysis assemblies such as unit 36 are seated on edges 32 and 35 of rear wall 28 and can be spaced respectively at an angle of 45° to each side of the unit 36 as shown in FIG. 6. With disc 52 rotating counterclockwise, phototransistor block 178 operates with the unit placed on edge 32 and phototransistor block 180 operates with the unit placed on edge 35. The various phototransistor blocks are adjustably mounted along the circumferential path about the axis of rotation of the chopper disc to permit selective synchronous phase signal generation for their respective gas analyzer units. This arrangement makes possible the use of a single chopper disc to act as a chopper common to the plurality of gas analyzer units permitting multiple gas or multiple constituent analysis of the same gas simultaneously. The phototransistors 172 and 174 cooperate with chopper disc 52 and signal separation circuitry to separate the sample and reference path electrical signals from the single detector 122 in such a manner that meaningful information indicative of the quantity of a particular gas in sample cell 96 can be precisely determined by comparison of such signals in various mathematical relationships.

During rotation of disc 52, infrared radiation passing through reference cell 94 and sample cell 96 is chopped. Chopping of the sample cell path can occur at a frequency different from chopping of the reference cell path dependent on selection of the chopper disc. The infrared radiation from both paths which falls on detector 122 causes the detector to generate an electrical output indicative of the amount of radiation which reaches the detector.

The electrical output of detector 122 is separated in response to the phase reference generating means to enable identifying that component of the infrared energy passing through sample chamber 96 with respect to the infrared energy which passes through reference chamber 94. Other phase reference generating means could be used, e.g., magnetic pickup devices or devices utilizing other types of radiation.

Figure 7:
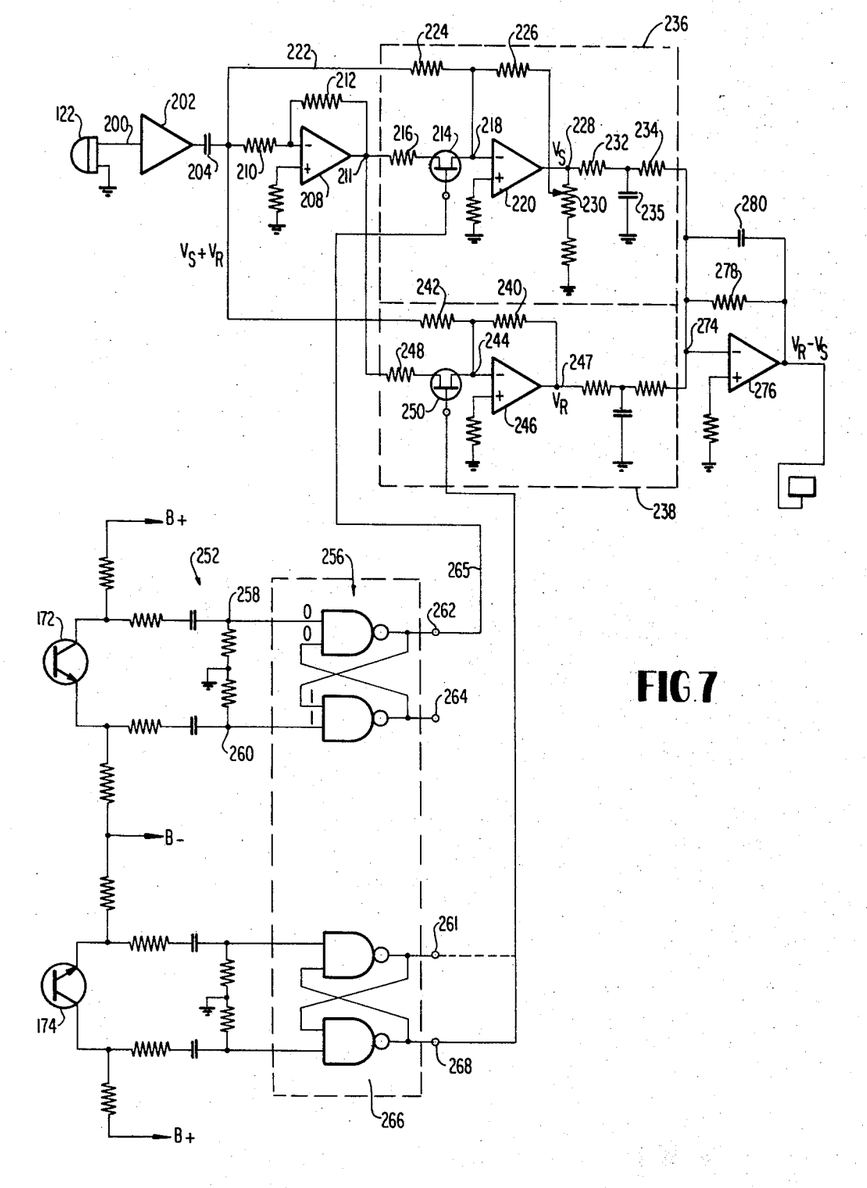

Referring to FIG. 7, the signal which appears at output line 200 of detector 122 is an alternating signal as a result of the chopping action of chopper disc 52. This signal is amplified by a preamplifier 202 in series with a capacitor 204 so that only alternating signals pass to junction 205.

In representative phase separation circuitry, the signal at juncture 205 is fed into two separate electrical channels, one for the sample gas path and one for the reference gas path. Each of such channels includes an operational amplifier with dual electrical inputs. These dual inputs include the combined sample and reference path output from the infrared detector and a signal from the gating device. The operational amplifier of each channel effectively combines these inputs to produce an output responsive to its respective gas path signal.

To describe this operation in more detail: junction 205 is connected to an inverting amplifier 208 via resistor 210. The feedback resistor 212 of amplifier 208 has the effect of merely inverting the signal appearing at junction 205, or differently stated, has the effect of multiplying the signal by −1. The signal then passes to a field effect transistor (FET) 214 via resistor 216. FET 214 functions as a gating device for passing the signal to input terminal 218 of operational amplifier 220 when FET 214 is conducting. The separation means make provision that the signal at junction 205 can reach input terminal 218 of operational amplifier 220 via the path including amplifier 208 and field effect transistor 214 when the field effect transistor is conducting; also the signal appearing at junction 205 can reach input terminal 218 via the path including line 222 and resistor 224.

Amplifier 220 has a feedback resistor 226 connected in series with output terminal 228 of amplifier 220 via potentiometer 230. The ratio of the value of resistor 224 to the combined resistance of resistor 226 and the portion of potentiometer 230 between output terminal 228 is approximately 1:1. On the other hand, the ratio of the effective part of potentiometer 230 and resistor 226 to resistor 216 is approximately 2:1. The effect of this arrangement is that signals appearing at input terminal 218 of amplifier 220 via the path including resistor 224 are simply inverted (or multiplied by $-1$) whereas signals appearing at input terminal 218 via FET 214 are inverted and multiplied by a factor of 2.

The signal at output terminal 228 of amplifier 220 passes through and is filtered, i.e., averaged, by the filter means including resistors 232 and 234 and capacitor 236.

The components of FIG. 7 described immediately above form one electrical channel of the circuit means and are set off in dotted line block 236. The second electrical channel includes the components within block 238. Components within block 238 have the same values as and are substantially identical to the corresponding components in block 236. Resistor 240 has the same value as resistor 242 so signals appearing at input terminal 244 of amplifier 246 are simply inverted or multiplied by $-1$. The ratio of resistor 240 to resistor 248 is 2:1 so signals through FET 250 are multiplied by a factor of 2 and are also inverted by amplifier 246 when FET of channel means 238 is conducting.

Channel 236 can be utilized as the reference or sample channel and channel 238 can be utilized as the sample or reference channel. As shown, channel 236 has its FET 214 gated "ON" in synchronism with the two outer windows of chopper 52 whereas channel 238 has its FET 250 gated "ON" in predetermined synchronism with the three inner windows of chopper disc 52. Phase sensitive separation can be implemented by use of separate frequencies for the sample and reference paths by utilization of the proper chopper disc.

The separate sample and reference channels are gated by the phase reference generating means within frame means 22 through bistable circuit means. The conduction of FET 214 is controlled by phototransistor 172 and conduction of FET 250 is controlled by phototransistor 174. Phototransistor 172 is connected in a symmetrical circuit 252 arrangement with NAND gate latch 256. The symmetrical circuit 252 is so arranged that when transistor 172 conducts there is a decrease in voltage (to a logic 0 level) at junction 258 and there is an increase in voltage (to a logic 1) level at junction 260. When phototransistor 172 becomes nonconducting the voltage at junction 260 decreases (to logic 0) and the voltage at junction 258 increases (to a logic 1 level). Correspondingly, whenever phototransistor 172 is illuminated so it becomes conducting, the output signal at terminal 262 of NAND gate 256 is at a high level (logic 1) and the output at terminal 264 is at a low level (logic 0). Since the two NAND gates are tied back to back, the output at terminal 262 will remain high to maintain FET 214 conducting until there is a transition of voltage from a high level to a low level at junction 260 (becomes logic 0). This transition at junction 260 occurs when phototransistor 172 receives no light from bulb 64. Simultaneously, the voltage level at junction 258 increases from a low to a high level. Correspondingly, when phototransistor 172 is dark, terminal 262 has a low output (logic 0) and terminal 264 has a high output (logic 1). With phototransistor 172 dark, FET 214 is nonconducting.

If it is desired to have FET 214 gated "ON" when phototransistor 172 is dark, it would merely be necessary to connect gate line 265 to terminal 264 of the NAND gate latch 256.

The circuitry and NAND gate latch arrangement for phototransistor 174 and its associated latch circuit 266 are identical in operation to that described for phototransistor 172. And, output terminal 268 of latch 266 corresponds to output terminal 262 of latch 256. Correspondingly, when phototransistor 174 is illuminated the voltage of terminal 268 is high, or logic 1, and FET 250 conducts.

When the diametrically opposite outer windows 140 and 142 of chopper disc 52 permit infrared radiation to pass through sample chamber 96, FET 214 is gated "ON"; when the disc 52 blocks the path of IR through sample chamber 96, FET 214 is nonconducting. Because of the negative symmetry of inner windows 144–146 of disc 52, phototransistor 174 is dark when the windows 144–146 allows IR to pass through reference chamber 94. Hence, FET 250 is nonconducting whenever IR passes through the reference chamber and is conducting whenever IR is blocked from the reference chamber by disc 52.

The amplified detector signal appearing at junction 205 is the composite of the voltages resulting from radiation from both the sample chamber 96 and the reference chamber 94. This is designated $V_s + V_r$; $V_s$ being the voltage signal resulting from IR passing along the sample gas path and $V_r$ being the voltage signal from IR passing along the reference gas path. By virtue of the $-1$ multiplication function of amplifier 220 for signals appearing at input terminal 218 via line 222 and resistor 224, the signal at output terminal 228 is $-(V_s + V_r)$ whenever FET 214 is nonconducting. By virtue of the inverting function of amplifier 208, the signal appearing at its output terminal 211 is $-(V_s + V_r)$. When FET 214 is conducting, and because of the $-2$ multiplication of amplifier 220 of signals appearing at junction 218 via the path including FET 214 and resistor 216, amplifier 220 functions also as an adder to add the quantity $(V_s + V_r)$ from resistor 224 to the quantity $-2(V_s + V_r)$ so the signal at output terminal 228 is $V_s + V_r$ when FET 214 is conducting.

It can be shown mathematically that the signal appearing at output terminal 228 is the function $-V_r$ and that the voltage appearing at output terminal 247 of amplifier 246 is the voltage $V_s$. The respective voltages $V_s$ and $-V_r$ are the results obtained from one complete revolution of disc 52. When these signals are added at the input summing junction 274 of output amplifier 276, the resulting output function is $V_s - V_r$. Since $V_r$ is a known, corresponding to the parts per million of the gas of interest, the percentage of or parts per million of the gas of interest in the sample call can be indicated directly on a suitably calibrated indicator, such as a D'Arsonval meter.

In order to obtain the desired output function, $V_r - V_s$ with the disc 154 of FIG. 5 where both the inner and outer windows are 180° out of phase so both phototransistor 172 and phototransistor 174 are in phase with the light passing through the respective sample and reference cells, the gate of FET 250 is connected to output terminal 261 of NAND latch 266 to reverse the phase of the phototransistor output with respect ot the windows 156 and 158. Such a connection is shown in dotted lines on FIG. 7. It can be shown that the voltage appearing at output terminal 228 of amplifier 220 is $-V_r$ and that the voltage at output terminal 247 of amplifier 246 is $V_s$. The output of amplifier 276 is the inverted algebraic difference providing the desired $V_r - V_s$ function. Resistor 278 establishes the D.C. gain amplifier 276 and capacitor 280 provides additional integration or averaging of the resulting output signal.

Other circuit means than described in relation to FIG. 7 can be used with the multiple gas analyses apparatus of FIGS. 1, 2, and 3.

Since the gas analyzer shown in FIGS. 1–7 operates on a comparison basis by comparing the infrared radiation received by the detector from the reference gas path with the radiation received by the detector from the sample gas path, and since the output signal is $V_s - V_r$, a zero voltage output indicates that the quantity of the gas of interest in the sample cell equals the quantity of that gas in the reference cell. Under normal conditions of operation, the output voltage will, for example, be negative when the quantity of the gas of interest in the sample cell is less than that in the reference cell and will then be positive when the quantity of the gas of interest in the sample cell is greater than that in the reference cell. Where, for example, the reference cell contains 10 parts per million of the gas of interest, a reading at meter 282 of 10 parts per million is indicative of zero output voltage from amplifier 276. To assure that the circuitry of FIG. 7 is operative and is not merely emitting a zero output voltage because it is inactive, solenoid 128 can be actuated by the operator of the equipment to block a predetermined portion of the path of infrared radiation through the sample chamber. Then if the meter does not move to a calibrated position, the operator knows that the equipment is defective.

The structure described provides a number of operational advantages. For example, the unitary body member 88 can be removed from the support plate means 74 thus providing ready access for cleaning the sample cell portions of windows 114 and 115. Also, the filter 123 provides the infrared frequency range of interest and is sturdily mounted on the detector itself eliminating the need for filters in both gas paths. Also, the integral mounting of source, detector, optics, cell structure, calibration means, and circuit housing on the support plate 74 provides a rugged device capable of taking the rough usage to be expected in, for example, checking automobile engine exhaust emissions.

The wall partition means supporting the chopper disc motor adds transverse bracing strength and the plate means add longitudinal strength to the device. The transverse partition is multi-functional in supporting the drive motor, disc, and photodetector blocks. It additionally provides support for the individual cover means for the optical assemblies.

Infrared gas analyses apparatus has been described specifically. It is to be understood that the same apparatus could be used in the visible and ultraviolet light regions of the spectrum with appropriate changes in radiation source, filters, and detector. Other phase reference generating means and other separation circuit means can be used without departing from the teachings of the invention. Also, modifications in materials and structural details made obvious by the present disclosure are included in the scope of the invention as covered by the appended claims.

What is claimed is:

1. Apparatus for simultaneously performing multiple gas analyses comprising
   frame means for supporting a plurality of individual optical gas analysis assemblies so as to dispose a portion of each such assembly along an arcuate path,
   each optical assembly including an elongated unitary body member having a generally U-shaped configuration in cross section,
   the unitary body member including longitudinally extending sidewalls joined by a bottom wall, and
   divider wall means, of curvilinear configuration in cross section, extending across the U-shaped configuration between the sidewalls,
   the divider wall means extending over the full longitudinal dimension of the elongated unitary body member to define in combination with the bottom wall and portions of the sidewalls a gas chamber which extends over the full longitudinal dimension of the unitary body member,
   the curvilinear cross-sectional configuration of the divider wall means defining a circumferential path, an elongated rigid support plate means and means for releasably securing the support plate means to the frame means,
   the elongated support plate means including closure means,
   means for joining the unitary body member to the elongated support plate means with the closure means extending longitudinally between longitudinal ends of the unitary body member and across the U-shaped configuration at its open end between the sidewalls of the unitary body member in gastight sealing relationship to form an additional longitudinally extending gas chamber defined by the divider means, closure means, and remaining portions of the sidewalls of the unitary body member, chamber window means located at longitudinal ends of the unitary body means sealing longitudinal ends of the gas chambers,
   the elongated support plate means further including means supporting a single source of radiant energy and a single detector for such radiant energy at opposite longitudinal ends of the elongated unitary body member and optical means for directing such radiant energy from the single source through the gas chambers to the single detector,
   means for predetermined cyclic interruption of radiant energy passing through the gas chambers of each optical system comprising a single chopper disc rotatable about a fixed central axis located in predetermined position relationship to the arcuate path disposition of the optical assemblies,
   the chopper disc including a plurality of windows predeterminedly spaced radially from the fixed central axis with a portion of the windows being spaced from the central axis a predetermined radial distance to permit passage of radiant energy in the gas chamber including the bottom wall of the unitary body member and a portion of the windows being spaced radially from the central axis to permit passage of radiant energy in the additional gas chamber of each optical gas analysis assembly upon rotation of the chopper disc about the fixed central axis with the predetermined arcuate path of disposition of such portions of the optical gas analyzer assembly being substantially circumferential with respect to the fixed central axis of the chopper disc, drive means for rotating the chopper disc, and circuit connector means for the output of the detector of each optical gas analysis assembly.

2. The apparatus of claim 1 in which the elongated support plate means includes inlet and outlet port means for directing test gas through one of the gas chambers.

3. The apparatus of claim 2 in which a plurality of inlet and outlet ports are distributed longitudinally along the closure means to permit selection of varying length gas paths.

4. The apparatus of claim 1 in which calibration means for each optical gas analysis assembly is supported on its respective elongated support plate means.

5. The apparatus of claim 1 including phase reference signal generating means mounted within the frame means for generating electrical phase reference output in predetermined synchronous relationship with cyclic interruption of radiant energy in the gas chambers.

6. The apparatus of claim 5 in which the phase reference signal generating means comprises photoresponsive means with a single source of light for the plurality of optical gas analysis assemblies disposed on one side of the chopper disc and separate signal generating photodetector means for each optical gas analysis assembly disposed on the opposite side of the chopper disc in position to receive light from such single light source through the chopper disc windows, means for disposing the photodetector means in substantially circumferential relationship to the fixed central axis of rotation of the chopper disc, and mounting means for predeterminedly positioning the photodetector means for each optical gas analysis assembly.

7. The apparatus of claim 6 in which the means for disposing the photodetector means comprises slot means defined by wall partitioning means within the frame means.

8. The apparatus of claim 7 in which the frame means defines access means for adjusting the position of the photodetector means along the slot means.

9. The apparatus of claim 6 in which the mounting means for each pair of photodetector means for each optical gas analysis assembly comprise block means movable substantially circumferentially about such fixed central axis to adjust the synchronous relationship of the phase reference generated output to passage of radiant energy through its respective optical gas analysis assembly.

10. The apparatus of claim 1 further including circuit means electrically connected to the output of the single detector means of each optical gas analysis assembly, such circuit means including phase sensitive circuit means responsive to the electrical output of the synchronizing means to convert the electrical output of the single detector means for each such assembly into separable electrical outputs indicative of the radiant energy passage through each gas chamber of such assembly, and output circuit means for each optical gas analysis assembly for producing an electric signal representative of a comparison of the passage of radiant energy through its respective gas chambers.

11. The apparatus of claim 1 in which the elongated support plate means is reinforced longitudinally.

12. The apparatus of claim 1 in which the bottom wall of the unitary body member has a curvilinear configuration defining a gas chamber having a generally half-moon configuration in cross section.

13. The apparatus of claim 12 in which the unitary body member includes transverse wall means extending in a transverse direction covering a portion of the cross-sectional area between the sidewalls to define a generally half-moon configuration in cross section for passage of radiant energy through the additional gas chamber.

14. The structure of claim 13 in which the transverse wall means are located at longitudinal ends of the unitary body member.

15. The structure of claim 13 in which the additional gas chamber defined in part by the transverse wall means has a cross-sectional area for passage of radiant energy slightly larger than the cross-sectional area for passage of radiant energy in the gas chamber formed by the divider means, bottom wall, and sidewall portions of the unitary body member.

16. The apparatus of claim 15 in which the elongated support plate means carries adjustable calibration means for equalizing the cross-sectional area for passage of radiant energy of the two gas chambers defined by the unitary body member and the closure means.

17. The apparatus of claim 14 in which the chamber window means are cemented to longitudinal ends of the unitary body member including the divider wall means to provide gas-tight sealing of the chambers.

18. The apparatus of claim 14 in which the chamber window means have a circular configuration.

19. The apparatus of claim 1 in which the single source of radiant energy is an infrared energy source and the single detector is a detector for infrared energy.

* * * * *